(12) United States Patent
Forghani et al.

(10) Patent No.: US 11,975,704 B2
(45) Date of Patent: May 7, 2024

(54) FAULT-TOLERANT BRAKE LOAD ALLEVIATION

(71) Applicant: THE BOEING COMPANY, Chicago, IL (US)

(72) Inventors: Nima Forghani, Seattle, WA (US); David T. Yamamoto, Mill Creek, WA (US); Levi Aren Mulkey, Chicago, IL (US)

(73) Assignee: THE BOEING COMPANY, Arlington, VA (US)

( * ) Notice: Subject to any disclaimer, the term of this patent is extended or adjusted under 35 U.S.C. 154(b) by 349 days.

(21) Appl. No.: 17/468,885

(22) Filed: Sep. 8, 2021

(65) Prior Publication Data

US 2022/0212642 A1 Jul. 7, 2022

Related U.S. Application Data

(60) Provisional application No. 63/133,838, filed on Jan. 5, 2021.

(51) Int. Cl.
*B60T 8/17* (2006.01)
*B60T 7/04* (2006.01)
(Continued)

(52) U.S. Cl.
CPC ............. *B60T 8/885* (2013.01); *B60T 7/042* (2013.01); *B60T 8/1703* (2013.01); *B60T 8/171* (2013.01);
(Continued)

(58) Field of Classification Search
CPC .............................. B60T 8/1703; B60T 8/885
See application file for complete search history.

(56) References Cited

U.S. PATENT DOCUMENTS

| 7,717,527 B1 | 5/2010 | Griffith |
| 9,950,699 B2 | 4/2018 | Kanemori et al. |

(Continued)

FOREIGN PATENT DOCUMENTS

| EP | 0927671 A3 | 3/2000 |
| EP | 0910526 B1 | 5/2003 |

(Continued)

OTHER PUBLICATIONS

Extended European Search Report for application No. 21217632.5 dated May 30, 2022, 6 pgs.

*Primary Examiner* — Long T Tran
(74) *Attorney, Agent, or Firm* — Moore IP Law

(57) ABSTRACT

A brake system control unit includes one or more sensor interfaces configured to receive a brake torque signal from a brake torque sensor. The brake system control unit also includes a torque estimator configured to generate an estimated brake torque signal based, at least in part, on a brake model and a brake actuator command. The brake system control unit further includes control circuitry configured to generate the brake actuator command to actuate a brake actuator of a brake system. The brake actuator command is generated based on a brake pedal command and a load alleviation command. The load alleviation command is based on the brake torque or the estimated brake torque signal, depending on whether a sensor fault condition associated with the brake torque sensor is detected.

23 Claims, 11 Drawing Sheets

(51) Int. Cl.
*B60T 8/171* (2006.01)
*B60T 8/174* (2006.01)
*B60T 8/88* (2006.01)

(52) U.S. Cl.
CPC ........... *B60T 8/174* (2013.01); *B60T 2220/04* (2013.01); *B60T 2250/04* (2013.01); *B60T 2270/406* (2013.01)

(56) References Cited

U.S. PATENT DOCUMENTS

| | | |
|---|---|---|
| 10,017,164 B2 | 7/2018 | Kanemori et al. |
| 2002/0116101 A1 | 8/2002 | Hashiba et al. |
| 2004/0054450 A1* | 3/2004 | Nakamura ................ B60T 8/00 701/22 |
| 2009/0276133 A1 | 11/2009 | May et al. |
| 2014/0212081 A1* | 7/2014 | Takahashi ............. G01L 5/0019 384/448 |
| 2018/0043792 A1* | 2/2018 | Sawada .................... B60L 7/10 |
| 2018/0134264 A1* | 5/2018 | Masuda .................. F16D 65/18 |
| 2019/0118784 A1* | 4/2019 | Yasui ...................... B60T 17/22 |
| 2019/0381894 A1* | 12/2019 | Kujubu ............... B60L 15/2018 |
| 2020/0317171 A1 | 10/2020 | Lestage et al. |

FOREIGN PATENT DOCUMENTS

| | | |
|---|---|---|
| EP | 3354523 A1 | 8/2018 |
| EP | 3418135 B1 | 11/2020 |

* cited by examiner

500

502

| BRAKE ACTUATOR COMMAND | TORQUE (FT – LB) | | | | | | | |
|---|---|---|---|---|---|---|---|---|
| | INITIAL | HISTORICAL VALUES | | | | | | TH$_1$ |
| | | 1 | 2 | 3 | 4 | 5 | 6 | |
| 0 | 0 | 0 | 0 | 0 | 0 | 0 | 0 | 0 |
| 10 | 0 | 0 | 0 | 0 | 0 | 0 | 0 | 0 |
| 20 | 15000 | 12500 | 13000 | 16500 | 14500 | 12700 | 15500 | 6200 |
| 30 | 22000 | 20500 | 21000 | 26000 | 21500 | 18000 | 19000 | 11500 |
| 40 | 28000 | 26500 | 25000 | 31000 | 27000 | 24000 | 23500 | 17500 |
| 50 | 33000 | 31000 | 31000 | 34500 | 31000 | 30700 | 32000 | 24200 |
| 60 | 38000 | 36000 | 37000 | | 35500 | 36000 | 34500 | 29500 |
| 70 | 40000 | 38500 | | | | 38000 | 37000 | 31500 |
| 80 | 45000 | | | | | | | |
| 90 | 50000 | | | | | | | |
| 100 | 55000 | | | | | | | |

| BRAKE ACTUATOR COMMAND | TORQUE (FT – LB) | | | | | | | |
|---|---|---|---|---|---|---|---|---|
| | INITIAL | HISTORICAL VALUES | | | | | | AVER. |
| | | 1 | 2 | 3 | 4 | 5 | 6 | |
| 0 | 0 | 0 | 0 | 0 | 0 | 0 | 0 | 0 |
| 10 | 0 | 0 | 0 | 0 | 0 | 0 | 0 | 0 |
| 20 | 21000 | 19950 | 20370 | 21420 | 20790 | 21210 | 22050 | 20970 |
| 30 | 30800 | 29260 | 29876 | 31416 | 30492 | 31108 | 32340 | 30756 |
| 40 | 38700 | 36765 | 37539 | 39474 | 38313 | 39087 | 40635 | 38645 |
| 50 | 45300 | 43035 | 43941 | 46206 | 44847 | 45753 | 47565 | 45235 |
| 60 | 50700 | 48165 | 49179 |  | 50193 | 51207 | 53235 | 50477 |
| 70 | 54800 | 52060 |  |  |  | 55348 | 57540 | 54937 |
| 80 | 57800 |  |  |  |  |  |  | 57800 |
| 90 | 59000 |  |  |  |  |  |  | 59000 |
| 100 | 60000 |  |  |  |  |  |  | 60000 |

INCREASING BRAKE TEMPERATURE

| BRAKE ACTUATOR COMMAND | TORQUE (FT – LB) @ BRAKE TEMP. T₁ | | | | | | | | |
|---|---|---|---|---|---|---|---|---|---|
| | INITIAL | HISTORICAL VALUES | | | | | | AVER. |
| | | 1 | 2 | 3 | 4 | 5 | 6 | |
| 0 | 0 | 0 | 0 | 0 | 0 | 0 | 0 | 0 |
| 10 | 0 | 0 | 0 | 0 | 0 | 0 | 0 | 0 |
| 20 | 21000 | 19950 | 20370 | 21420 | 20790 | 21210 | 22050 | 20970 |
| 30 | 30800 | 29260 | 29876 | 31416 | 30492 | 31108 | 32340 | 30756 |
| 40 | 38700 | 36765 | 37539 | 39474 | 38313 | 39087 | 40635 | 38645 |
| 50 | 45300 | 43035 | 43941 | 46206 | 44847 | 45753 | 47565 | 45235 |
| 60 | 50700 | 48165 | 49179 | | 50193 | 51207 | 53235 | 50477 |
| 70 | 54800 | 52060 | | | | 55348 | 57540 | 54937 |
| 80 | 57800 | | | | | | | 57800 |
| 90 | 59000 | | | | | | | 59000 |
| 100 | 60000 | | | | | | | 60000 |

FAULT-TOLERANT BRAKE LOAD ALLEVIATION

CROSS-REFERENCE TO RELATED APPLICATIONS

The present application claims priority from U.S. Provisional Patent Application No. 63/133,838 entitled "FAULT-TOLERANT BRAKE LOAD ALLEVIATION," filed Jan. 5, 2021, the contents of which are incorporated by reference in their entirety.

FIELD OF THE DISCLOSURE

The present disclosure is generally related to brake load alleviation systems and methods. In particular, the present disclosure relates to fault-tolerant brake load alleviation systems and methods.

BACKGROUND

Other factors being equal, lighter weight vehicles tend to be more efficient than heavier vehicles. Accordingly, vehicle designers, manufacturers, and users may prefer to decrease structural weight of a vehicle; however, the option to lower the weight of many vehicle structures is limited due to material and design considerations. For example, a vehicle that is braking heavily may experience significant loads. The magnitude of loads expected due to heavy braking can be large enough to drive the design of the structures for the vehicle, which may result in increased vehicle weight.

SUMMARY

In a particular implementation, a brake system control unit includes one or more sensor interfaces configured to receive a brake torque signal from a brake torque sensor. The brake system control unit also includes a torque estimator configured to generate an estimated brake torque signal based, at least in part, on a brake model and a brake actuator command. The brake system control unit further includes control circuitry configured to generate the brake actuator command to actuate a brake actuator of a brake system. The brake actuator command is generated based on a brake pedal command and a load alleviation command. The load alleviation command is based on the brake torque signal or the estimated brake torque signal, depending on whether a sensor fault condition associated with the brake torque sensor is detected.

In another particular implementation, a method includes receiving, at a brake system control unit, a brake pedal command. The method also includes determining, at the brake system control unit, whether a sensor fault condition is detected based on a brake torque signal from a brake torque sensor. The method further includes, in response to detecting the sensor fault condition, accessing a brake model from a memory accessible to the brake system control unit, generating an estimated brake torque signal based on the brake model and a brake actuator command, and generating a load alleviation command based on the estimated brake torque signal.

In another particular implementation, a vehicle includes one or more wheels coupled to a structure and one or more brake systems. Each brake system includes one or more sensors and one or more brake actuators. The vehicle also includes one or more brake system control units. Each brake system control unit includes one or more sensor interfaces configured to receive a brake torque signal from a brake torque sensor. Each brake system control unit also includes a torque estimator configured to generate an estimated brake torque signal based, at least in part, on a brake model and a brake actuator command. Each brake system control unit further includes control circuitry configured to generate the brake actuator command to actuate a brake actuator of the one or more brake actuators. The brake actuator command is generated based on a brake pedal command and a load alleviation command. The load alleviation command is based on the brake torque signal or the estimated brake torque signal, depending on whether a sensor fault condition associated with the brake torque sensor is detected.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 5 is an example of a table including historical brake command and brake torque data according to a particular implementation of the brake system of FIG. 1.

FIG. 6 is another example of a table including historical brake command and brake torque data according to a particular implementation of the brake system of FIG. 1.

DETAILED DESCRIPTION

Figure 1:
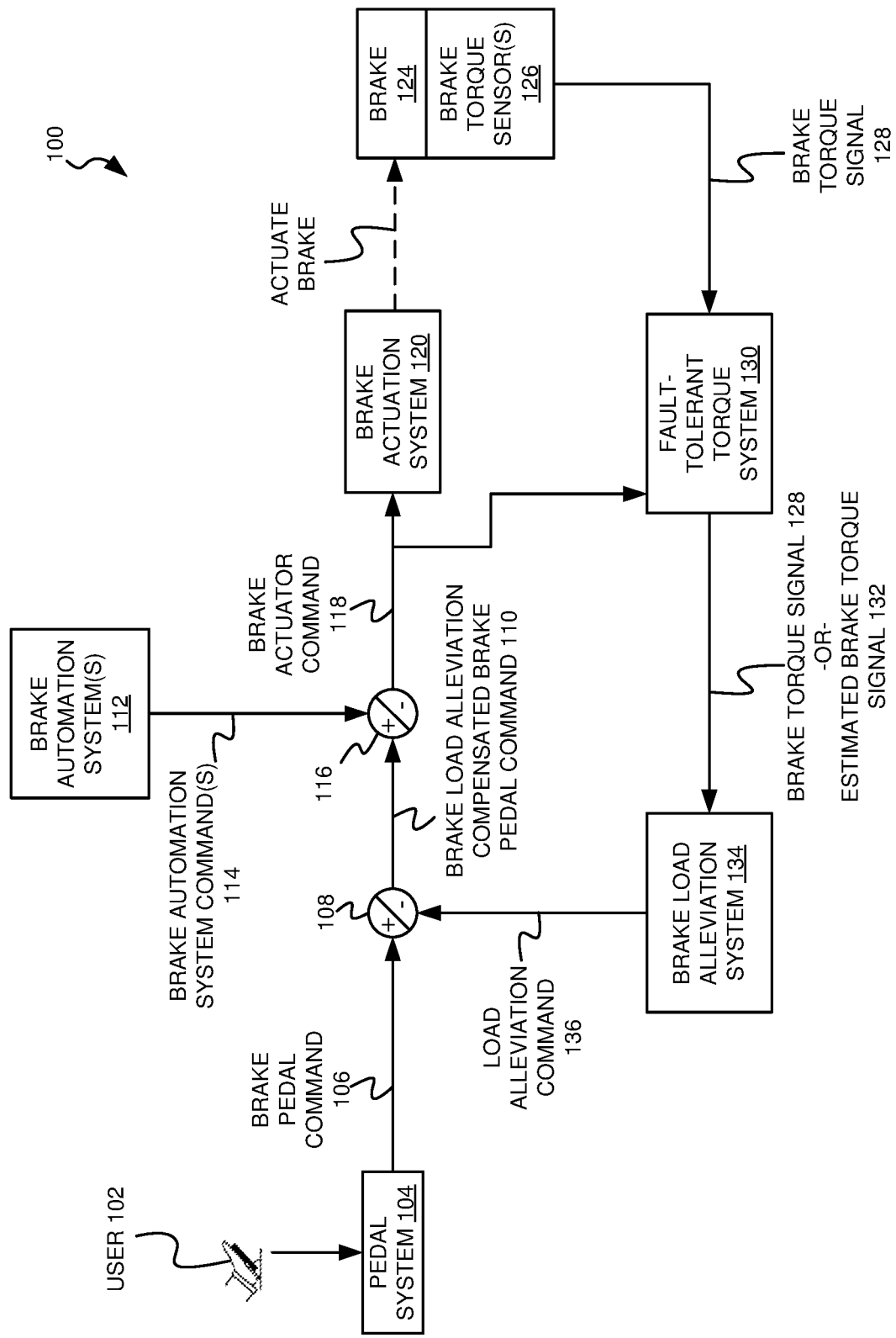
FIG. 1 is a block diagram of a brake system configured to provide fault-tolerant brake load alleviation according to a particular implementation.

The weight of structural elements coupled to brake systems of some vehicles can be reduced by using a brake load alleviation system. A brake load alleviation system protects the structural elements of the vehicle by limiting loads applied to the structural elements during braking. For example, a closed-loop brake load alleviation system uses sensor feedback data to indicate brake force or brake torque applied during braking and limits the brake force or brake torque to some specified threshold to protect the structural elements of the vehicle.

The sensors that provide the sensor feedback data in such systems are generally located at or near wheels of the vehicle. As such, these sensors may be exposed to harsh environments, which can lead to sensor failure. When sensor feedback data is not available due to sensor failure, the brake load alleviation system is either bypassed or operates in an open-loop mode.

When a brake load alleviation system is bypassed or in open-loop mode, load limits enforced by the brake load alleviation system may be exceeded unless other operational limits are imposed on the vehicle. For example, an aircraft may be required to operate with a reduced take-off weight limit to ensure that structural load limits are not exceeded. As another example, braking distances of the vehicle may be increased to reduce peak brake force. In an aircraft example, increased braking distances may require the aircraft to use a longer runway, which may delay dispatch of the aircraft if no such runway is available or is overburdened.

Aspects disclosed herein present systems and methods for fault-tolerant brake load alleviation. The disclosed systems and methods enable improved operation of a brake load alleviation system when a sensor fault is present. For example, the disclosed systems and methods may enable operation of the brake load alleviation system even with a sensor fault that would prevent a traditional brake load alleviation system from performing its desired function. The fault-tolerant brake load alleviation systems and methods disclosed use a vehicle-specific (or even axle-specific or wheel-specific) brake model that is generated during closed-loop operations to generate an estimated feedback sensor signal when the feedback signal is not available or is not reliable (e.g., due to a sensor fault). Because the brake model is custom-built for the particular vehicle (and perhaps for a specific axle or wheel of the vehicle) and frequently updated, the estimated feedback signal reliably limits the loads to which vehicles structures are subjected, enabling operation of the vehicle without imposing additional operational limits (e.g., operational weight limits or braking distance limits).

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 2:
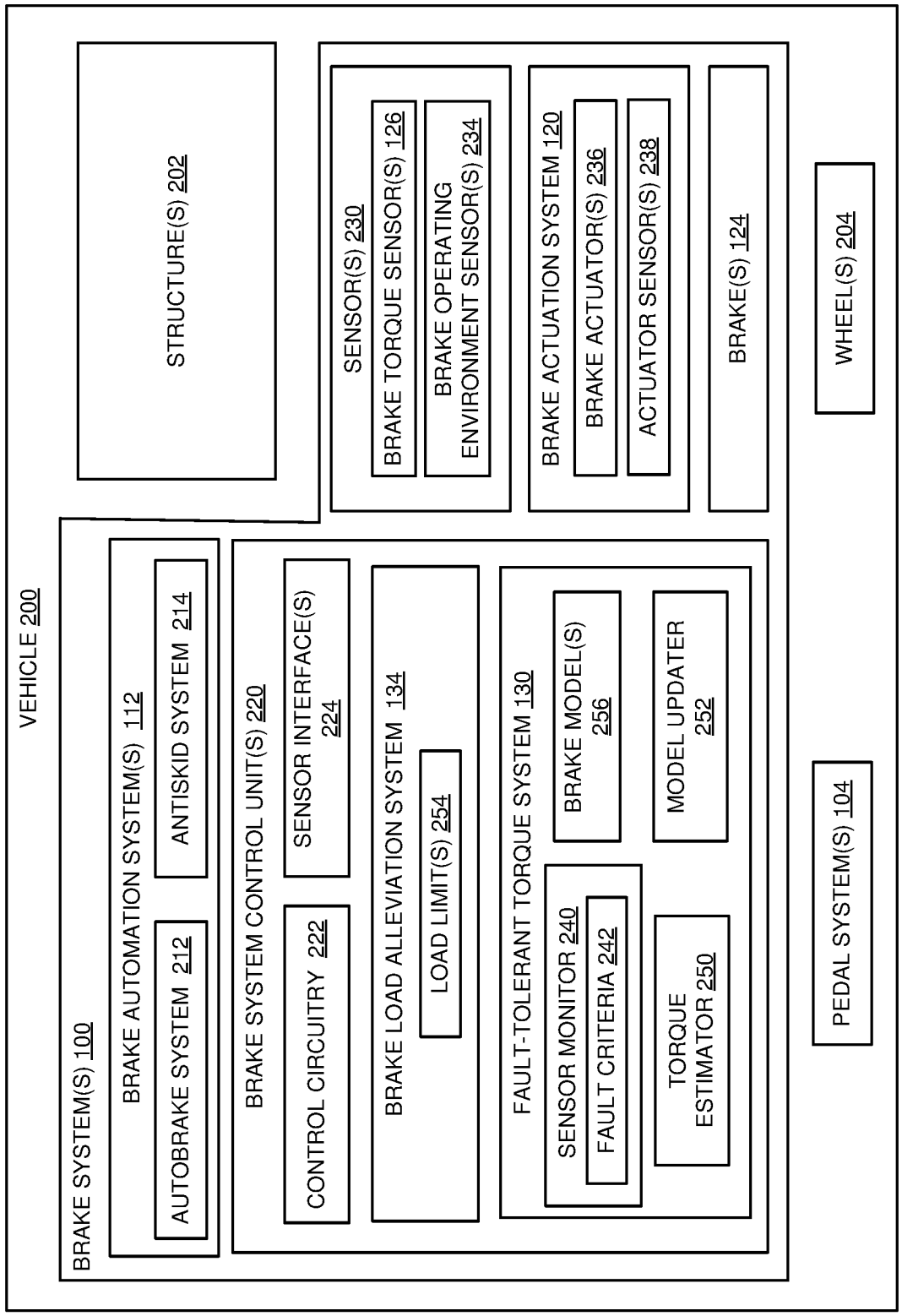
FIG. 2 is a block diagram of a vehicle that includes the brake system of FIG. 1 coupled to one or more structures according to a particular implementation.

Particular implementations are described herein with reference to the drawings. In the description, common features are designated by common reference numbers throughout the drawings. Some features described herein are singular in some implementations and plural in other implementations. To illustrate, FIG. 2 depicts a vehicle 200 that includes one or more brake systems 100 ("brake system(s)" in FIG. 2), which indicates that in some implementations the vehicle 200 includes a single brake system 100, and in other implementations the vehicle 200 includes multiple brake systems 100. For ease of reference herein, such features are generally introduced as "one or more" features and are subsequently referred to as optionally plural, which is indicated by "(s)" following a term, as in "brake system(s) 100" of FIG. 2. Such features may also be referred to in the singular when a representative of such features is being described.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

The following discussion frequently refers to brake torque as an indication of load applied to structures of a vehicle. It is noted at the outset that brake force or load may be used instead of or in addition to brake torque to indicate load applied to the structures of the vehicle. For convenience of description (e.g., rather than constantly making reference to "brake torque or brake force"), brake torque is used throughout the following description. However, it is understood that brake force can be substituted for brake torque throughout the following description with corresponding calculation changes where needed (e.g., converting force to torque by use of data descriptive of the configuration of the brake system and attachments to the structures).

FIG. 1 depicts an example of a brake system 100 according to a particular implementation. The brake system 100 includes a brake load alleviation system 134 configured to limit load applied to a structure of a vehicle during vehicle braking. The target brake load of brake load alleviation system 134 may vary as a function of time to further limit dynamic braking loads. As a result, the structure can be designed to withstand smaller braking loads than may be encountered without the brake load alleviation system 134. The brake load alleviation system 134 uses feedback (e.g., a brake torque signal 128) from one or more brake torque sensors 126 to limit the braking load. For example, the brake torque signal 128 indicates load that is applied to the structure of the vehicle during a braking operation, and, during normal operation (e.g., when no sensor fault is detected), the brake load alleviation system 134 determines a load alleviation command 136 based on the brake torque signal 128. The load alleviation command 136 is used to limit a brake actuator command 118 sent to a brake actuation system 120 responsive to a brake pedal command 106.

The brake system 100 further includes a fault-tolerant torque system 130. The fault-tolerant torque system 130 is configured to detect whether the brake torque sensor(s) 126 is experiencing a fault condition. If the fault-tolerant torque system 130 detects a fault condition associated with the brake torque sensor(s) 126, the fault-tolerant torque system 130 provides an estimated brake torque signal 132 (rather than the brake torque signal 128) to the brake load alleviation system 134. The estimated brake torque signal 132 is generated based on a model of the brake system 100. In a particular aspect, during braking operations in which the fault-tolerant torque system 130 does not detect a fault condition, the fault-tolerant torque system 130 updates the model of the brake system 100. As a result the model is regularly updated, and the fault-tolerant torque system 130 is able to generate values of the estimated brake torque signal 132 that closely approximates values of the brake torque signal 128 that would be present if no sensor fault condition were present.

The brake system 100 includes a pedal system 104 configured to generate the brake pedal command 106 based on input from a user 102. The brake pedal command 106 is combined, at a first node 108, with the load alleviation command 136 to generate a brake load alleviation compensated brake pedal command 110. The load alleviation command 136 limits the brake pedal command 106 to prevent a braking operation from exceeding specified load limits associated with a structure.

In some implementations, the brake system 100 includes or is coupled to brake automation system(s) 112 that provide brake commands (e.g., brake automation system command(s) 114) that are combined, at a second node 116, with the brake load alleviation compensated brake pedal command 110 to generate the brake actuator command 118. In implementations that do not include the brake automation system(s) 112, brake load alleviation compensated brake pedal command 110 is used as the brake actuator command 118.

The brake actuator command 118 is provided to the brake actuation system 120 which actuates the brake 124 responsive to the brake actuator command 118. The brake 124 performs a braking operation which decreases the speed of the vehicle and applies a resulting load to structures of the vehicle. If the brake torque sensor(s) 126 are operating properly, the brake torque sensor(s) 126 send the brake torque signal 128 to the fault-tolerant torque system 130. The brake torque signal 128 indicates a measured brake torque generated due to the braking operation. If the brake torque sensor(s) 126 are experiencing a fault condition, the brake torque sensor(s) 126 either do not generate the brake torque signal 128 or generate a brake torque signal 128 that is outside an expected range.

The fault-tolerant torque system 130 evaluates the brake torque signal 128 to determine whether the brake torque sensor(s) 126 are experiencing a fault condition. The fault-tolerant torque system 130 outputs the brake torque signal 128 to the brake load alleviation system 134 if no fault condition is detected. If a fault condition is detected, the fault-tolerant torque system 130 outputs the estimated brake torque signal 132. The estimated brake torque signal 132 is generated based on the model of the brake system 100 and the brake actuator command 118, as described further below.

The brake load alleviation system 134 generates the load alleviation command 136 based on the brake torque signal 128 or the estimated brake torque signal 132. Thus, the brake load alleviation system 134 is able to operate reliably when a sensor fault condition is detected.

FIG. 2 depicts an example of a vehicle 200 that includes one or more wheels 204 coupled to one or more structures 202. The vehicle 200 also includes one or more brake systems 100. The brake system(s) 100 are configured to limit loads applied to the structure(s) 202 during braking. As a result, the structure(s) 202 can be designed to withstand smaller braking loads than may be encountered without the described brake system(s) 100. Ensuring that the structure(s) 202 are subjected to smaller braking loads enables vehicle designers to reduce the overall weight of the vehicle 200. The vehicle 200 can include or correspond to any wheeled vehicle with onboard brakes. For example, the vehicle 200 may be a land vehicle, such as a truck, a train, or a car. As another example, the vehicle 200 may be an aircraft, in which case the wheel(s) 204 correspond to those installed on a landing gear. Further, the vehicle 200 may be moved by an onboard engine or motor, or the vehicle 200 may be moved by an offboard source. For example, the vehicle 200 may include a trailer or train car with an onboard brake system.

In a particular implementation, each wheel 204 is associated with a brake system 100. In some implementations, one brake system 100 is associated with two or more of the wheels 204 (e.g., multiple wheels on a common axle). In the example illustrated in FIG. 2, each brake system 100 includes a brake actuation system 120, such as a pneumatic, electrical, or hydraulic power source that provides power to actuate one or more brake actuators 236 of the brake system 100. In other implementations, two or more brake systems 100 share a brake actuation system 120. For example, a single hydraulic system may be coupled to two or more brake systems 100 of the vehicle 200.

Many implementations use friction-based braking. In such implementations, each brake actuator 236 is coupled indirectly to one of the wheels 204 via a pair of friction surfaces. For example, a wheel 204 is coupled to a rotor or drum that includes a first friction surface that turns with the wheel 204. In this example, the brake actuator 236 associated with the wheel 204 is coupled to a brake stator, brake pad, or brake shoe that includes a second friction surface. The brake actuator 236 moves the second friction surface into contact with or away from contact with the first friction surface. To illustrate, during braking, the brake actuator 236 presses the second friction surface into contact with the first friction surface to decrease a rate of rotation of the wheel 204. In other implementations, the brake system 100 uses another mechanism, in addition to or instead of friction, to decrease a rate of rotation of the wheel 204. One example of a non-friction-based brake mechanism is regenerative braking in which electromotive forces are used to decrease a rate of rotation of the wheel 204. Other examples include compression braking or hydraulic braking in which braking causes compression of or induces drag in a fluid to decrease a rate of rotation of the wheel 204.

In the example illustrated in FIG. 2, the brake system(s) 100 include or are associated with the brake automation system(s) 112, such as an autobrake system 212, and/or an antiskid system 214. The brake system(s) 100 also include one or more brake system control units 220. Each brake system control unit 220 includes control circuitry 222, one or more sensor interfaces 224, and the brake load alleviation system 134. In some implementations, the brake automation system(s) 112 are integrated within the brake system control unit 220. In still other implementations, the brake automation system(s) 112 are omitted.

The sensor interface(s) 224 of a brake system control unit 220 are configured to receive sensor data and/or signals from sensor(s) 230 of the brake system(s) 100. For example, the sensor(s) 230 may include one or more brake torque sensors 126 that are configured to provide one or more brake torque signals to the brake system control unit(s) 220 via the sensor interface(s) 224. In some implementations, one or more brake load sensors may be used instead of or in addition to the brake torque sensor(s) 126. As another example, the sensor(s) 230 may include one or more brake operating environment sensors 234 that are configured to provide one or more brake operating environment signals to the brake system control unit(s) 220 via the sensor interface(s) 224. The brake operating environment sensor(s) 234 measure conditions such as vehicle speed, ground speed, wheel speed, brake temperature, wheel temperature, or other braking-related conditions.

The control circuitry 222 is configured to generate brake actuator command(s) to actuate the brake actuator(s) 236 responsive to one or more brake input signals (e.g., the brake pedal command 106 of FIG. 1, the brake automation system command(s) 114 of FIG. 1, or both). The brake load alleviation system 134 is configured to provide the control circuitry 222 with the load alleviation command 136 of FIG. 1 to limit the brake actuation signal(s) such that such the load applied to a portion of the structure(s) 202 during braking is less than specified load limit(s) 254.

For example, during operation, the brake system 100 receives the brake input signal(s) (e.g., the brake pedal command 106 of FIG. 1, the brake automation system command(s) 114 of FIG. 1, or both). The brake system control unit 220 provides the brake actuator command 118 of FIG. 1 to the brake actuation system 120 based on the brake input signal(s) and based on the load alleviation command 136 from the brake load alleviation system 134. During normal operation, the load alleviation command 136 is based on the brake torque signal 128 from the brake torque sensor(s) 126. However, when a sensor monitor 240 of the fault-tolerant torque system 130 detects a sensor fault condition associated with the brake torque sensor(s) 126, the load alleviation command 136 from the brake load alleviation system 134 is determined based on one or more brake models 256 of the fault-tolerant torque system 130.

The sensor monitor 240 is configured to detect fault conditions associated with the sensor(s) 230. For example, the sensor monitor 240 may compare a measured brake torque value (indicted by the brake torque signal 128 of FIG. 1) to one or more fault criteria 242. In this example, the fault criteria 242 indicate an expected range of brake torque values, and the sensor monitor 240 indicates that a sensor fault condition is detected if the measured brake torque value is outside of the expected range of brake torque values. In some implementations, the expected range of brake torque values is based on brake torque values stored in a memory during periods of operation of the brake system 100 when no fault condition was detected. Additionally, or alternatively, in some implementations, the expected range of brake torque values is based on default values, such as brake torque values determined during testing of the vehicle 200 or other similar vehicles.

In some implementations, at least one of the fault criteria 242 is based on historical brake torque values and one or more brake actuator command values associated with the one or more historical brake torque values. The brake actuator command values correspond to values indicated by the brake actuator command 118 of FIG. 1. For example, the brake actuator command 118 can indicate a relative magnitude of a braking operation, such as a percentage of an operational range of the brake system 100. To illustrate, a brake actuator command value of fifty percent (50%) indicates that the braking operation should be approximately half as aggressive as a braking operation performed responsive to a one hundred percent (100%) brake actuator command value. FIG. 5 illustrates an example of a table 500 indicating threshold values 508 associated with the fault criteria 242 according to a particular implementation. In FIG. 5, the table 500 includes a set of initial default brake torque values 504 and a set of subsequent historical brake torque values 506, where each brake torque value corresponds to a particular value of the brake actuator command. In some implementations, the table 500 represents values for particular brake operating environment conditions, such as a particular brake temperature, wheel temperature, wheel speed, ground speed, or a combination thereof that can have an effect on brake torque. In such implementations, other tables may be used to represent values for other brake operating environment conditions.

In FIG. 5, the threshold values 508 indicate a lower value for a valid brake torque sensor reading for each brake actuator command value. To illustrate, for a brake actuator command value 502 of ten percent (10%), a brake torque sensor reading of 0 ft-lb (foot-pounds) or more is considered valid based on the threshold values 508; however, for a brake actuator command value 502 of fifty percent (50%), a brake torque sensor reading of 24200 ft-lb or more is considered valid. In some implementations, the table 500 may also indicate an upper threshold for one or more the brake actuator command values 502.

In some implementations, the threshold values 508 are determined based on the historical brake torque values 506. For example, the threshold value 508 for the brake actuator command value of fifty percent (50%) may be determined based on a statistical analysis of the historical brake torque values 506 corresponding to the brake actuator command value of fifty percent (50%). To illustrate, the threshold value 508 for the brake actuator command value of fifty percent (50%) may be set based on a multiple (e.g., 2×) of a standard deviation of the historical brake torque values 506 corresponding to the brake actuator command value of fifty percent (50%). In other illustrative examples, other statistical analyses can be used to determine a lower (or upper) bound of a valid sensor reading based on the historical brake torque values 506.

Returning to the example of FIG. 2, the fault-tolerant torque system 130 includes a torque estimator 250 that is configured to generate the estimated brake torque signal 132 of FIG. 1 when the sensor monitor 240 detects a sensor fault condition. The estimated brake torque signal 132 is based, at least in part, on the one or more brake models 256 and the brake actuator command 118 provided to the brake actuation system, 120. The brake model(s) 256 relate the brake actuator command 118 (and possibly other data, such as brake operating environment data) to historical brake torque values measured during periods of operation when no sensor fault was detected. As an example, a brake model 256 may include parameters of a gain-based torque estimation function, such as in Equation 1:

$$\tau_{estimate} = B \times G \quad \text{Equation 1}$$

where $\tau_{estimate}$ is an estimated brake torque value, B is a value indicating a magnitude of the braking operation (e.g., a value of the brake actuator command), and G is a brake gain value based on historical brake torque measurements during periods when no sensor fault was detected. In some implementations, the brake gain value, G, has different values depending on brake operating environment values, such as wheel speed, ground speed, brake temperature, or wheel temperature.

Additionally, or alternatively, the value of the brake gain value, G, may be valid for a particular range of brake actuator command values. For example, a matrix data structure may include brake gain values, G, for various combinations of brake actuator command values, wheel speeds, ground speeds, brake temperatures, wheel temperatures, or other braking-related values. In some circumstances, the brake gain value, G, used to calculate the estimated brake torque value, $\tau_{estimate}$, may be determined by interpolation between available brake actuator command values and brake gain values. In this example, the estimated brake torque value, $\tau_{estimate}$, is determined by selecting a brake gain value, G, based on the brake actuator command value, B, values of the brake operating environment signal(s), or both, and multiplying the selected brake gain value, G, by the brake actuator command value, B.

As another example, a brake model 256 may include one or more tables or other data structures or knowledge representations that store measured brake torque values when particular brake actuator commands 118 were provided to the brake actuation system 120 during historical braking operations when no sensor fault was detected. In this example, if a sensor fault is detect during braking, a value of the brake actuator command 118 sent to the brake actuation system 120 is used to look up, retrieve, and/or calculate an estimated brake torque value from the brake model(s) 256. If the value of the brake actuator command 118 does not correspond exactly to a brake actuator command value of the brake model(s) 256, the estimated brake torque value may be estimated by interpolation between two or more values in the brake model(s) 256. Alternatively, the brake model(s) 256 may include both the brake gain value, G, from Equation 1 and values from one or more tables. In this example, a coarse estimate of the brake torque value may be determined from the one or more tables and subsequently be refined using the brake gain function.

FIG. 6 illustrates an example of a table 600 indicating estimated brake torque values 602 for various brake actuator command values 502 according to a particular implementation. In FIG. 6, the table 600 includes the set of initial default brake torque values 504 and the set of historical brake torque values 506, described with reference to FIG. 5. In the example illustrated in FIG. 6, the estimated brake torque value 602 associated with each brake actuator command value 502 is an average of the historical brake torque values 506 for the brake actuator command value 502. For example, for the brake actuator command value 502 of thirty percent (30%), the estimated brake torque value 602 is 30756, which is an average determined based on the historical brake torque values 506. In some implementations, a sliding average value is used. For example, after a particular number of historical brake torque values 506 are stored in the table 600, a new historical brake torque value 506 added to the table 600 replaces the oldest historical brake torque value 506 for the same brake actuator command value 502, and the average of the historical brake torque values 506 is recalculated to determine the estimated brake torque value 602 for the brake actuator command value 502. The initial default brake torque values 504 are used to determine the estimated brake torque value 602 if sufficient historical brake torque values 506 are not available.

Figures 7, 8:
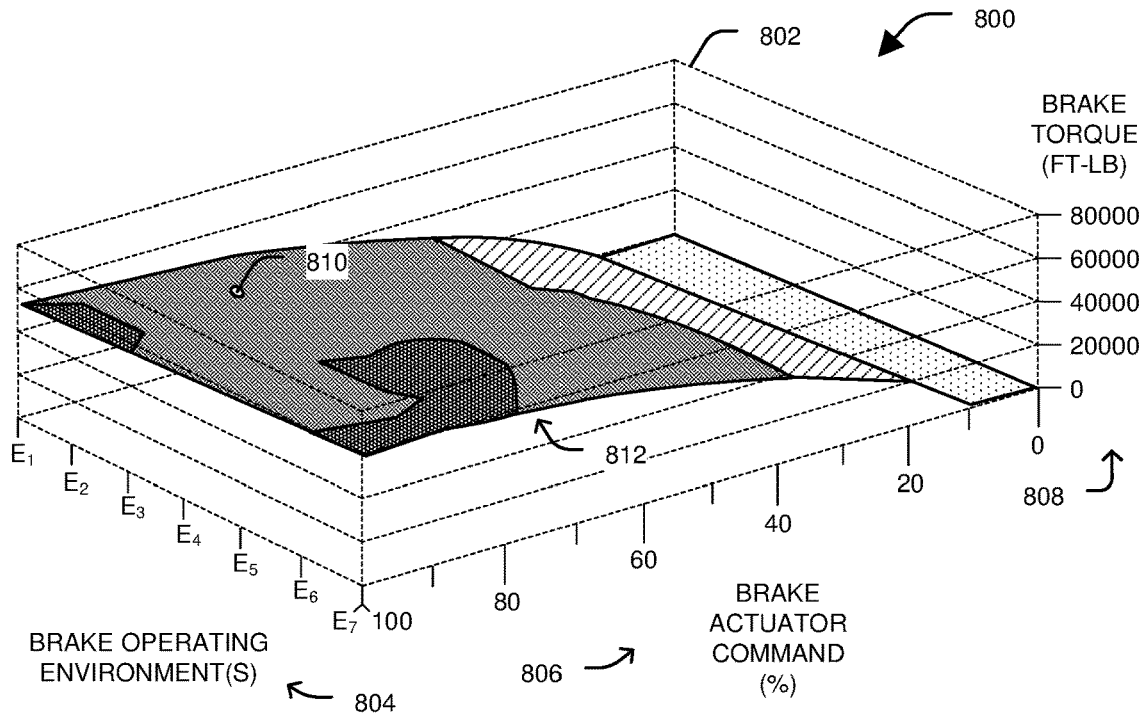
FIG. 7 is an example of a data structure including historical brake command and brake torque data according to a particular implementation of the brake system of FIG. 1.
FIG. 8 is a graph illustrating aspects of a brake model according to a particular implementation of the brake system of FIG. 1.

In some implementations, the brake load alleviation system 134 includes different brake models 256 for different brake operating environments. In such implementations, the specific brake model 256 used in a particular situation is selected based on a brake operating environment value from the brake operating environment sensor(s) 234. For example, FIG. 7 illustrates an example of a set of tables 700 of the brake model(s) 256 according to a particular implementation. In the example of FIG. 7, the table 600 is a first table associated with a first brake operating environment value, such as a first brake temperature value, $T_1$. In this example, the set of tables 700 also includes one or more additional tables associated with other brake operating environment value, such as a second table 704 associated with a second brake temperature value, $T_2$, and a third table 706 associated with a third brake temperature value, $T_3$. In this example, an estimated brake torque value may be interpolated between tables 600, 704, 706, between brake actuator command values 502, or both. To illustrate, an estimated brake torque value for a brake actuator command value 502 of forty-five percent (45%) at a brake temperature value between $T_2$ and $T_1$ may be determined by interpolation between the estimated brake torque values associated with the brake actuator command values 502 of forty percent (40%) and fifty percent (50%) for the brake temperature $T_1$ and the estimated brake torque values associated with the brake actuator command values 502 of forty percent (40%) and fifty percent (50%) for the brake temperature $T_2$. Although brake temperature is used as an example in FIG. 7, in other examples, other brake operating environment values are used in addition to or instead of the brake temperature.

FIG. 8 illustrates an example of the brake model(s) 256 represented as a surface 812 in a feature space 802 according to another particular implementation. In FIG. 8, the feature space 802 has a brake actuator command dimension 806, a brake torque dimension 808, and one or more brake operating environment dimensions 804. For ease of illustration, only one brake operating environment dimension 804 is illustrated in FIG. 8; however, in some implementations, the feature space 802 includes more than one brake operating environment dimension 804. For example, the feature space 802 may include a wheel temperature dimension and a wheel speed dimension, or some other combination of brake operating environment dimensions.

In the example illustrated in FIG. 8, the coordinate location in the feature space 802 of a particular point on the surface 812 indicates an expected brake torque value for given brake operating environment value and brake actuator command values. To illustrate, in FIG. 8, a point 810 on the surface 812 can be identified based on a brake operating environment coordinate (e.g., approximately $E_3$ in FIG. 8) and a brake actuator command value coordinate (e.g., approximately 75% in FIG. 8). The brake operating environment coordinate and the brake actuator command coordinate together specify a unique location on the surface 812, and an estimated brake torque value for the unique location (e.g., the point 810) is specified by a brake torque coordinate of the point 810.

In FIG. 2, the fault-tolerant torque system 130 also includes a model updater 252. The model updater 252 is configured to update the brake model(s) 256 when no sensor fault condition associated with the brake torque sensor(s) 126 is detected. For example, the model updater 252 may store model update data associating a value from the brake actuator command 118 with a brake torque value from the brake torque signal 128. As another example, the model updater 252 may verify or update parameters of the brake gain function (such as Equation 1) based on the value of the brake actuator command 118 and the brake torque value. In some implementations, the model update data also associate values of the brake operating environment data with the brake actuator command value and the brake torque signal.

Thus, the fault-tolerant torque system 130 enables fault tolerant and reliable operation of the brake load alleviation system 134 when a sensor fault condition is detected. To illustrate, on an aircraft, the fault-tolerant torque system 130 determines the force or torque gain for each brake on a given landing gear and stores the information in a memory of the brake system control unit 220 to generate the brake model(s) 256. The brake model(s) 256 are regularly or periodically updated (by the model updater 252) to account for changes in the brake system(s) 100 or other portions of the vehicle 200. During an initial learning phase (e.g., before sufficient actual operational data is available to generate a brake model 256 that is customized to the brake system(s) 100), the brake model(s) 256 use default values (e.g., based on testing or certification data of the vehicle or based on conservative engineering estimates). To illustrate, during the initial learning phase, the fault-tolerant torque system 130 determines the estimated brake torque signal 132 using initial parameters of the brake model 256 and subsequently uses updated parameters generated by the model updater 252.

Although the sensor interface(s) 224, the control circuitry 222, the fault-tolerant torque system 130, and the brake load alleviation system 134 are depicted as separate components in FIG. 2, in other implementations the described functionality of two or more of the sensor interface(s) 224, the control circuitry 222, the fault-tolerant torque system 130, and the brake load alleviation system 134 can be performed by a single component. In some implementations, each of the sensor interface(s) 224, the control circuitry 222, the fault-tolerant torque system 130, and the brake load alleviation system 134 correspond to or include hardware, such as an application-specific integrated circuit (ASIC) or a field-programmable gate array (FPGA), or the operations described with reference to the sensor interface(s) 224, the control circuitry 222, the fault-tolerant torque system 130, and the brake load alleviation system 134 may be performed by a processor executing computer-readable instructions.

Figure 3:
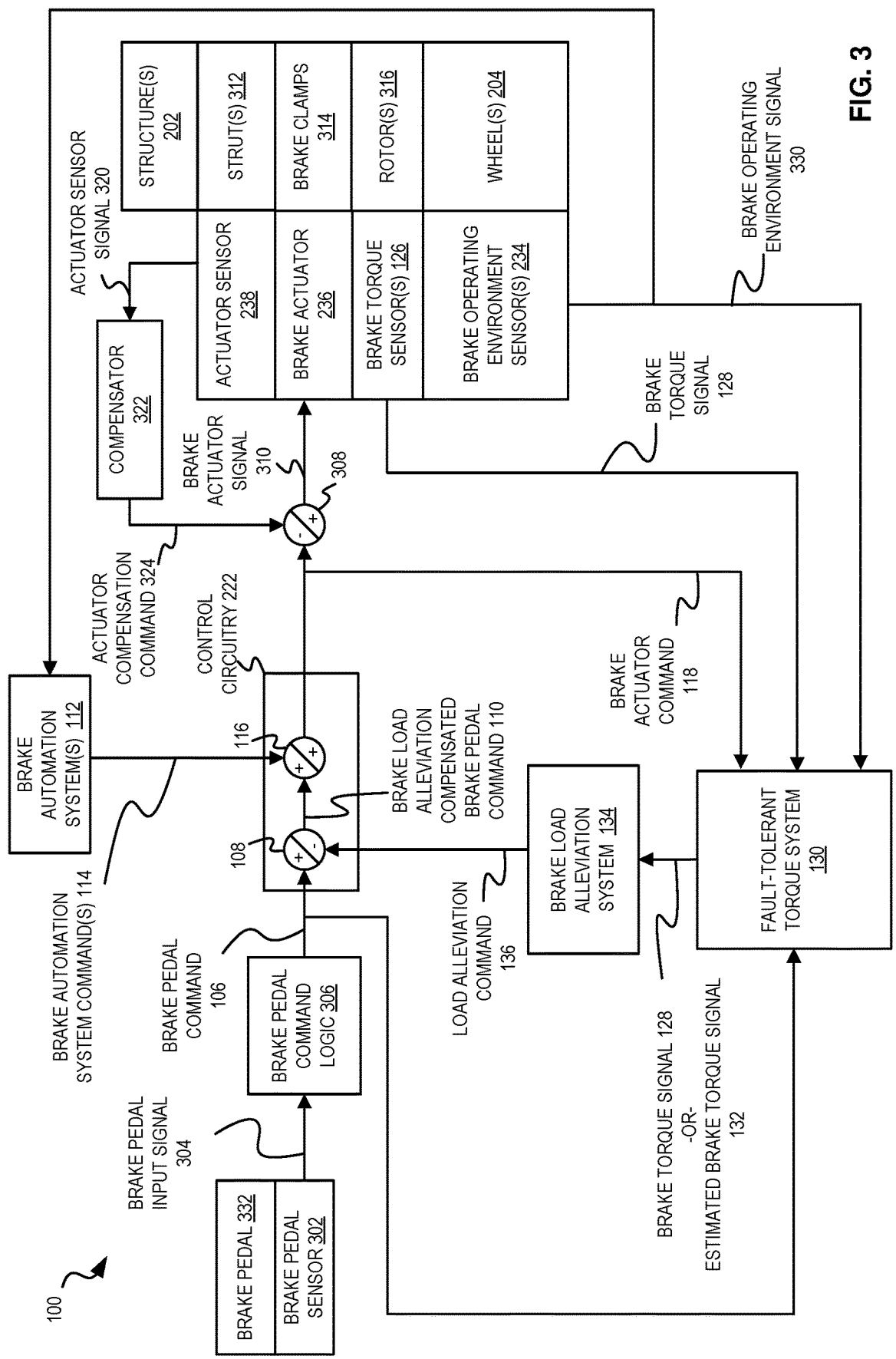
FIG. 3 is a diagram illustrating aspects of the brake system of FIG. 1 according to a particular implementation.

FIG. 3 is a diagram illustrating aspects of the brake system 100 of FIGS. 1 and 2 according to a particular implementation. The diagram illustrated in FIG. 3 illustrates a single wheel 204 and associated components (e.g., one or more strut(s) 312, a brake actuator 236, an actuator sensor 238, brake clamps 314, one or more rotor(s) 316, one or more brake torque sensor(s) 126, and one or more brake operating environment sensor(s) 234). When more than one wheel 204 of the vehicle 200 has brakes, the control circuitry 222, the brake load alleviation system 134, the fault-tolerant torque system 130, and the components associated with the wheel 204 may be replicated for each braked wheel.

In FIG. 3, a brake pedal 332 is coupled to a brake pedal sensor 302. The brake pedal sensor 302 generates a brake pedal input signal 304 based on a position of the brake pedal 332. Brake pedal command logic 306 generates the brake pedal command 106, which is provided to the control circuitry 222 and to the fault-tolerant torque system 130. In the implementation illustrated in FIG. 3, the fault-tolerant torque system 130 uses the brake pedal command 106 to determine a brake mode, which assists with detecting sensor faults, as described with reference to FIG. 4.

The first node 108 of the control circuitry 222 determines the brake load alleviation compensated brake pedal command 110 based on a difference between the brake pedal command 106 and the load alleviation command 136 from the brake load alleviation system 134. The load alleviation command 136 is based on either the brake torque signal 128 or the estimated brake torque signal 132 from the fault-tolerant torque system 130.

In the example of FIG. 3, the second node 116 determines the brake actuator command 118 based on the brake load alleviation compensated brake pedal command 110 and one or more brake automation system commands 114 from the brake automation system(s) 112. In this example, the brake automation system(s) 112 include systems or components that provide brake input via mechanisms other than the brake pedal 332. The autobrake system 212 and the antiskid system 214 of FIG. 2 are examples of such brake automation system(s) 112. Although FIG. 3 illustrates the first node 108 and the second node 116 as summing nodes, in other implementations, more complex control logic may be used.

In the example of FIG. 3, the brake actuator command 118 is provided to the fault-tolerant torque system 130. The brake actuator command 118 is also provided to the brake actuation system 120 of FIGS. 1 and 2, which in FIG. 3 includes a third node 308, the brake actuator 236, the actuator sensor 238, and a compensator 322. The third node 308 generates a brake actuator signal 310 based on the brake actuator command 118 and an actuator compensation command 324 from the compensator 322. The compensator 322 generates the actuator compensation command 324 based on an actuator sensor signal 320 from the actuator sensor 238 associated with the brake actuator 236. For example, in FIG. 3, the compensator 322 may compensate for response characteristics of a servo or valve of the brake actuator 236. In another example, the compensator 322 may be coupled to multiple brake actuators 236 and actuator sensors 238. In this example, the compensator 322 may be used to adjust the brake actuator signals 310 sent to the multiple brake actuators 236 based on the brake actuator command 118 to even out braking among the multiple brake actuators 236.

In the particular example illustrated in FIG. 3, responsive to the brake actuator signal 310, the brake actuator 236 causes the brake clamps 314 to contact or press on the rotor(s) 316 thereby braking the wheel(s) 204 and applying a torque on the structure(s) 202 due to braking force coupled to the structure(s) 202 via the strut(s) 312. The brake torque sensor(s) 126 are coupled to the strut(s) 312, the structure(s) 202, or both, to generate the brake torque signal 128 indicative of the braking torque applied to the structure(s) 202. In some implementations, the dimensions of the strut(s) 312 are known and the braking torque may be indicated by measuring braking force applied by the brake clamps 314. In such implementations, a force sensor rather than a torque sensor can be used to measure a value that is indicative of the brake torque.

The brake torque signal 128 is provided to the fault-tolerant torque system 130. Additionally, in some implementations, the brake operating environment sensor(s) 234 provide one or more brake operating environment signals 330 as input to the fault-tolerant torque system 130. The fault-tolerant torque system 130 evaluates the brake torque signal 128 (e.g., based on the fault criteria 242 of FIG. 2) to determine whether a sensor fault condition is detected. If no sensor fault condition is detected, the fault-tolerant torque system 130 provides the brake torque signal 128 to the brake load alleviation system 134. In this circumstance, the brake load alleviation system 134 generates the load alleviation command 136 based on the brake torque signal 128. In some implementations, when no sensor fault is detected, the fault-tolerant torque system 130 also uses the brake torque signal 128, the brake actuator command 118, and the brake operating environment signal(s) 330 to generate model update data to update the brake model(s) 256.

If the fault-tolerant torque system 130 detects a sensor fault, the fault-tolerant torque system 130 provides the estimated brake torque signal 132 to the brake load alleviation system 134. In this circumstance, the brake load alleviation system 134 generates the load alleviation command 136 based on the estimated brake torque signal 132. The fault-tolerant torque system 130 calculates or looks up an estimated brake torque value based on historical values of the brake torque responsive to a similar value of the brake actuator command 118 and under similar brake operating environment (as indicated by the brake operating environment signal(s) 330). Additional details regarding operation of the fault-tolerant torque system 130 are described below.

Figure 4:
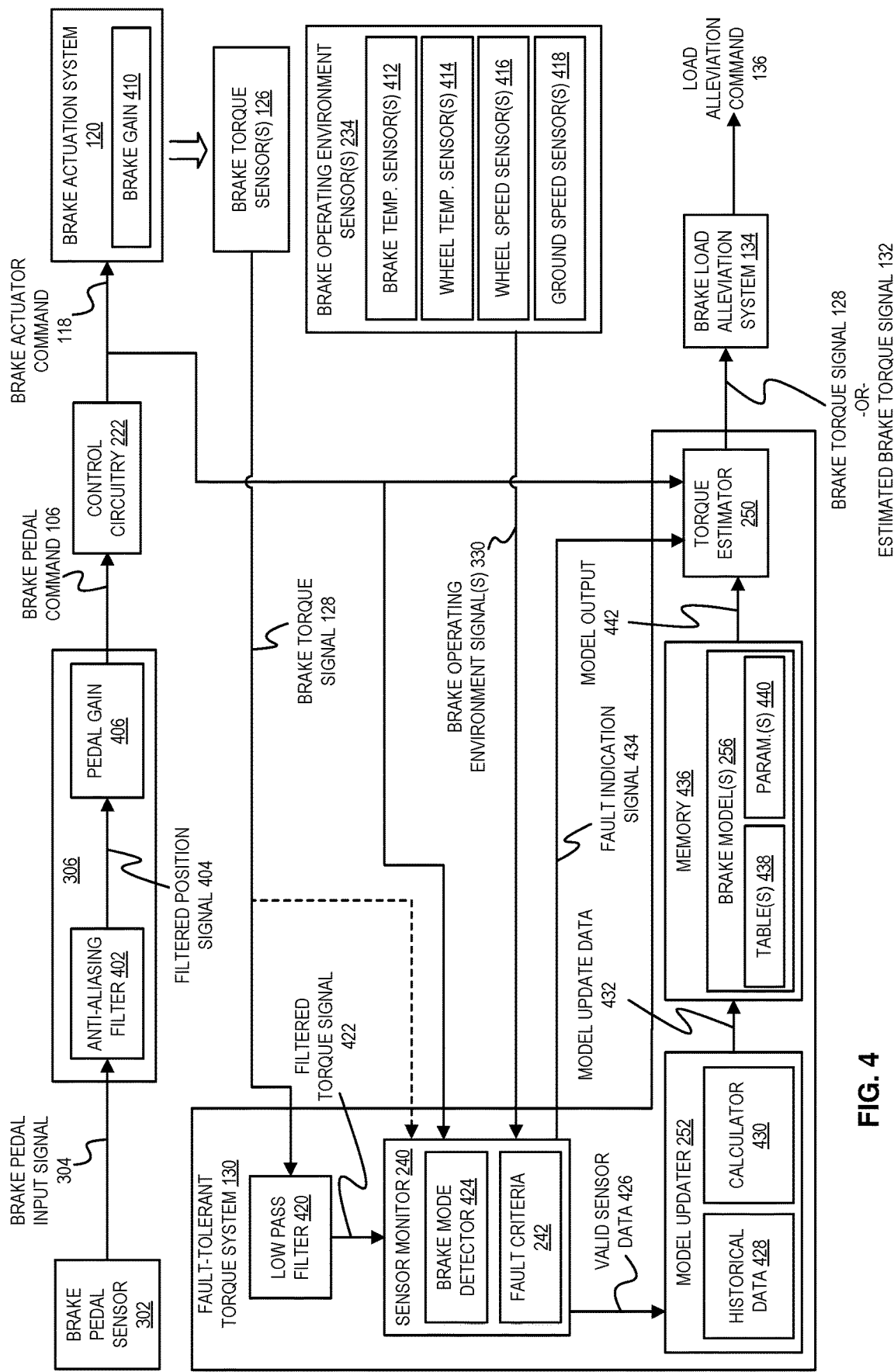
FIG. 4 is a diagram illustrating aspects of the brake system of FIG. 1 according to a particular implementation.

FIG. 4 is a diagram illustrating aspects of the brake system 100 of FIGS. 1-3 according to a particular implementation. In particular, FIG. 4 illustrates further details of the fault-tolerant torque system 130 and interactions between the fault-tolerant torque system 130 and other components of the vehicle 200 of FIG. 2.

In FIG. 4, the brake pedal sensor 302 sends the brake pedal input signal 304 to the brake pedal command logic 306. The brake pedal command logic 306 generates a filtered position signal 404 by passing the brake pedal input signal 304 through an anti-aliasing filter 402. The brake pedal command logic 306 applies a pedal gain 406 to the filtered position signal 404 to generate the brake pedal command 106. The brake pedal command 106 is provided to the control circuitry 222, which generates the brake actuator command 118 based in part on the brake pedal command 106. In some implementations, such as in the example illustrated in FIG. 3, the brake pedal command 106 is also provided to the fault-tolerant torque system 130. To illustrate, in such implementations, the brake pedal command 106 may be provided to a brake mode detector 424 to facilitate detection of sensor fault conditions, as discussed further below. In other implementations, such as in the example illustrated in FIG. 4, the brake actuator command 118 is used for brake mode detection.

In the example illustrated in FIG. 4, the brake actuator command 118 is sent to the brake actuation system 120. The brake actuation system 120 generates a braking force (and corresponding braking torque) due to braking in response to the brake actuator command 118. A brake gain 410 describes a relationship between a value of the brake actuator command 118 and a value of the braking force or braking torque.

The brake torque sensor(s) 126 generate the brake torque signal 128 indicative of the braking torque. The brake torque signal 128 is provided to the fault-tolerant torque system 130. Additionally, in some implementations, the brake operating environment sensor(s) 234 provide brake operating environment signal(s) 330 to the fault-tolerant torque system 130. In the example, illustrated in FIG. 4, the brake operating environment sensor(s) 234 include one or more of brake temperature sensor(s) 412, wheel temperature sensor(s) 414, wheel speed sensor(s) 416, or ground speed sensor(s) 418.

In the example of FIG. 4, the fault-tolerant torque system 130 uses a low pass filter 420 to remove high frequency components of the brake torque signal 128 to generate a filtered torque signal 422. The filtered torque signal 422, the brake operating environment signal(s) 330, and the brake actuator command 118 (or the brake pedal command 106) are provided as input to the sensor monitor 240.

In FIG. 4, the sensor monitor 240 includes a brake mode detector 424. The brake mode detector 424 determines whether a braking operation should be evaluated by the fault-tolerant torque system 130. Since a function of the brake load alleviation system 134 is to limit loads applied to particular structures of a vehicle during braking, factors that contribute to loading the particular structures are considered to determine whether the braking operation should be evaluated by the fault-tolerant torque system 130. For example, the brake mode detector 424 may consider brake operating environment information, such as wheel speed or ground speed, determined from the brake operating environment signal(s) 330. In this example, if the wheel speed or ground speed is less than a threshold, the brake mode detector 424 may determine that the fault-tolerant torque system 130 does not need to evaluate the braking operation, in which case, no further action is taken by the fault-tolerant torque system 130. As another example, the brake mode detector 424 may consider the magnitude of a braking operation, as indicated by the brake pedal command 106 or the brake actuator command 118. In this example, if the magnitude of a braking operation is less than a threshold, the brake mode detector 424 may determine that the fault-tolerant torque system 130 does not need to evaluate the braking operation, in which case, no further action is taken by the fault-tolerant torque system 130.

If the brake mode detector 424 determines that the braking operation should be evaluated by the fault-tolerant torque system 130, the sensor monitor 240 compares the brake torque signal 128, the filtered torque signal 422, or both, to the fault criteria 242. In the example of FIG. 4, if no fault is detected, valid sensor data 426 is provided to the model updater 252, and the brake torque signal 128 is provided to the brake load alleviation system 134 to generate the load alleviation command 136. Alternatively in the example of FIG. 4, if a fault is detected, a fault indication signal 434 is provided to the torque estimator 250, and the torque estimator 250 determines the estimated brake torque signal 132 based on model output 442. The estimated brake torque signal 132 is provided to the brake load alleviation system 134 to generate the load alleviation command 136.

The valid sensor data 426 includes data from the brake torque signal 128 and the brake actuator command 118. In some implementations, the valid sensor data 426 also includes data from the brake operating environment signal(s) 330. The model updater 252 uses the valid sensor data 426 to generate model update data 432 to update the brake model(s) 256. As an example, the model updater 252 stores historical data 428 indicating historical values of the valid sensor data 426, such as a valid historical brake torque signal value, a corresponding brake actuator command value, and a corresponding brake temperature value. The model updater 252 adds the valid sensor data 426 as one or more data entries in the historical data 428, and a calculator 430 of the model updater 252 determines the model update data 432 based on the valid sensor data 426 and the historical data 428. For example, as described with reference to FIG. 6, the calculator 430 may determine an average or moving average of the historical data 428. As another example, the calculator 430 may shift or modify the surface 812 within the feature space 802 of FIG. 8 to generate the model update data 432. As yet another example, the calculator 430 may update a brake gain parameter used by a torque estimation function, such as Equation 1 above. In some implementations, the historical data 428, including the valid sensor data 426, can be used to update or modify the threshold values 508 used by the fault criteria 242, as described with reference to FIG. 5. The model update data 432 is stored in a memory 436 to update one or more tables 438 of the brake model(s) 256, to update one or more parameters 440 of the brake model(s) 256, or both.

The fault indication signal 434 causes the torque estimator 250 to generate the estimated brake torque signal 132 based on the model output 442, which is based on the brake actuator command 118 and the brake model(s) 256. In some implementations, the torque estimator 250 generates the estimated brake torque signal 132 based further on the brake operating environment signal(s) 330. As a first example, when the brake model(s) 256 include the tables 438 or other data structures (such as illustrated in FIGS. 5-7) that store estimated brake torque values for particular brake actuator command values, the torque estimator 250 looks up a value of the estimated brake torque signal 132 from the table(s) 438 or other data structure(s) based on the value of the brake actuator command 118. As a second example, when the brake model(s) 256 include parameters 440 of a function (such as the brake gain parameter of Equation 1), the torque estimator 250 calculates a value of the estimated brake torque signal 132 based on the value of the brake actuator command 118 and the brake gain parameter value.

Figure 9:
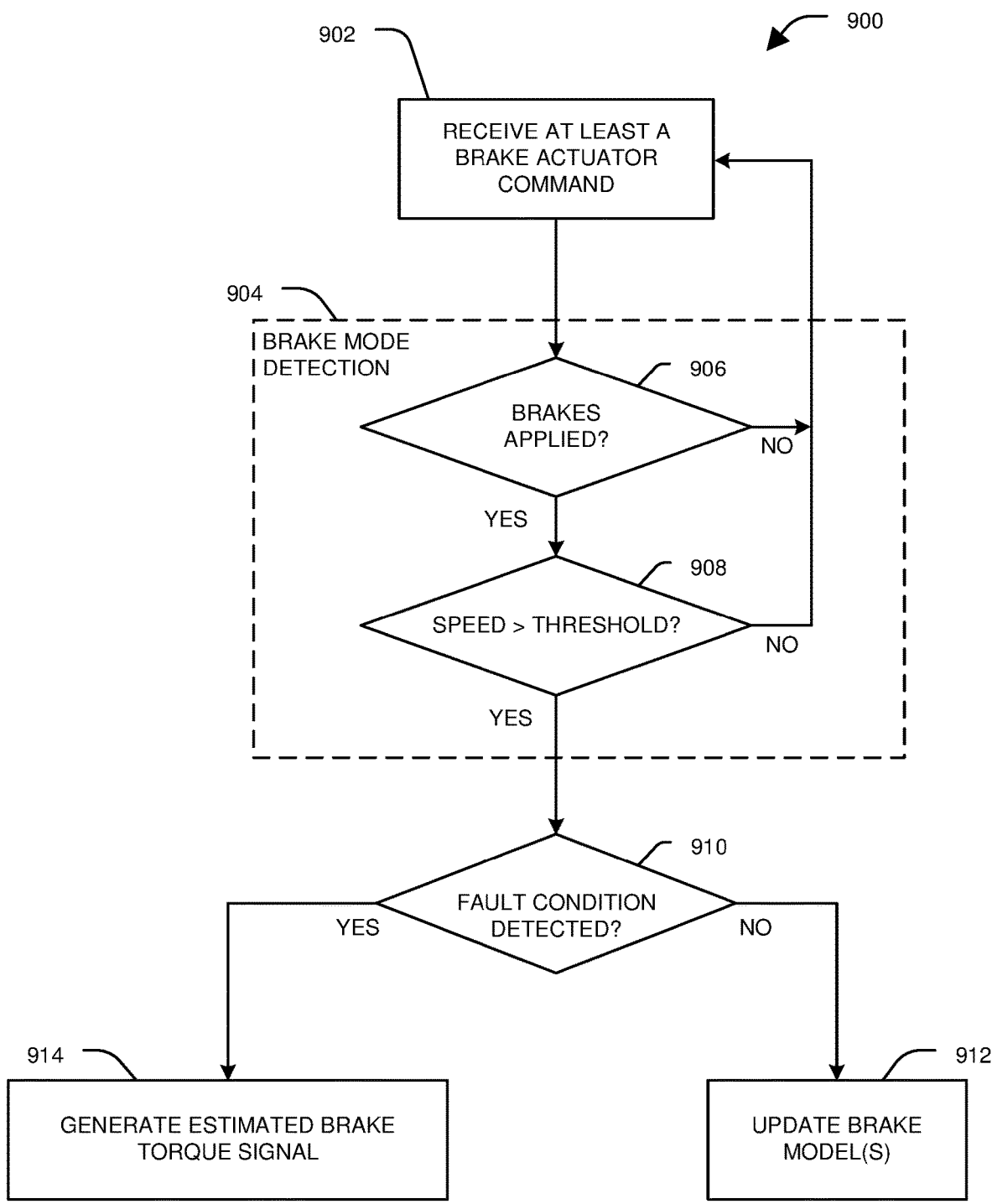
FIG. 9 is a flowchart of a method implemented by the brake system of FIG. 1 according to a particular implementation.

FIG. 9 is a flowchart of an example of a method 900 implemented by the brake system 100 of FIGS. 1-4 according to a particular implementation. For example, the method 900 may be initiated, performed, or controlled by the fault-tolerant torque system 130 or one or more components thereof.

The method 900 includes, at block 902, receiving at least a brake actuator command. For example, the fault-tolerant torque system 130 of FIGS. 1-4 receives the brake actuator command 118 from the control circuitry 222. At block 902, the method 900 may also include receiving other signals including a brake torque signal and/or one or more brake operating environment signal(s). For example, the fault-tolerant torque system 130 of FIGS. 1-4 receives the brake torque signal 128 from the brake torque sensor(s) 126 and receives the brake operating environment signal(s) 330 from the brake operating environment sensor(s) 234. In some situation, the brake torque sensor(s) 126 may experience a fault condition that results in the fault-tolerant torque system 130 not receiving the brake torque signal 128 when a brake torque signal 128 is expected (e.g., during a braking operation in which significant brake torque is generated). Such situations result in detection of a fault condition as discussed further below.

The method 900 includes, at block 904, performing brake mode detection, which in the method 900 includes, at block 906, determining whether brakes are applied. For example, a determination of whether the brakes are applied may be made based on the brake pedal command 106 or based on the brake actuator command 118. If the determination at block 906 is that the brakes are not applied, the method 900 returns to block 902 to await receipt of subsequent signals.

If the determination at block 906 is that the brakes are applied, the method 900 proceeds, at block 908, to determine whether a speed of the vehicle 200 is greater than a threshold. For example, a wheel speed value or a ground speed value from the brake operating environment signal(s) 330 may be compared to a threshold. If the determination at block 908 is that the speed of the vehicle 200 is less than (or less than or equal to) the threshold, the method 900 returns to block 902 to await receipt of subsequent signals. If the determination at block 908 is that the speed of the vehicle 200 is greater than the threshold, the method 900 determines, at 910, whether a fault condition is detected. In implementations that do not use the brake operating environment sensor(s) 234 to generate the brake operating environment signal(s) 330, the decision at block 908 is omitted.

If a brake torque signal 128 is received at block 902, the determination, at block 910, of whether a fault condition is detected includes comparing a value indicated by the brake torque signal 128 to the fault criteria 242 to determine whether the brake torque signal value is valid. If the value indicated by the brake torque signal 128 is valid (e.g., if the value of the brake torque signal is within a threshold range indicted by the fault criteria 242), block 910 indicates that no fault is detected, and the method 900 proceeds to block 912. If the value indicated by the brake torque signal 128 is not valid (e.g., if the value of the brake torque signal 128 is outside the threshold range indicated by the fault criteria 242), block 910 indicates that a fault is detected, and the method 900 proceeds to block 914. Additionally, in some implementations, if no brake torque signal 128 is received at block 902 when one is expected (e.g., when the brake mode detection of block 904 indicates that the brakes are applied and the vehicle is moving at a speed greater than a threshold), block 910 indicates that a fault is detected.

If the determination at block 910 is that no fault condition is detected, then the brake torque signal 128 is considered to include valid sensor data 426, and the method 900 includes, at block 912, updating a brake model based on the valid sensor data 426. For example, the valid sensor data 426 may be provided to the model updater 252, which may update the brake model(s) 256.

If the determination at block 910 is that a fault condition is detected, the method 900 includes, at block 914, generating an estimated brake torque signal 132 based on a brake model 256. For example, the torque estimator 250 may use the brake model(s) 256 and the brake actuator command 118 to determine a value of the estimated brake torque signal 132.

Additionally, if the determination at block 910 is that no fault condition is detected, the value indicated by the brake torque signal 128 is provided to the brake load alleviation system 134. Alternatively, if the determination at block 910 is that a fault condition is detected, the estimated brake torque signal 132 is provided to the brake load alleviation system 134.

Figure 10:
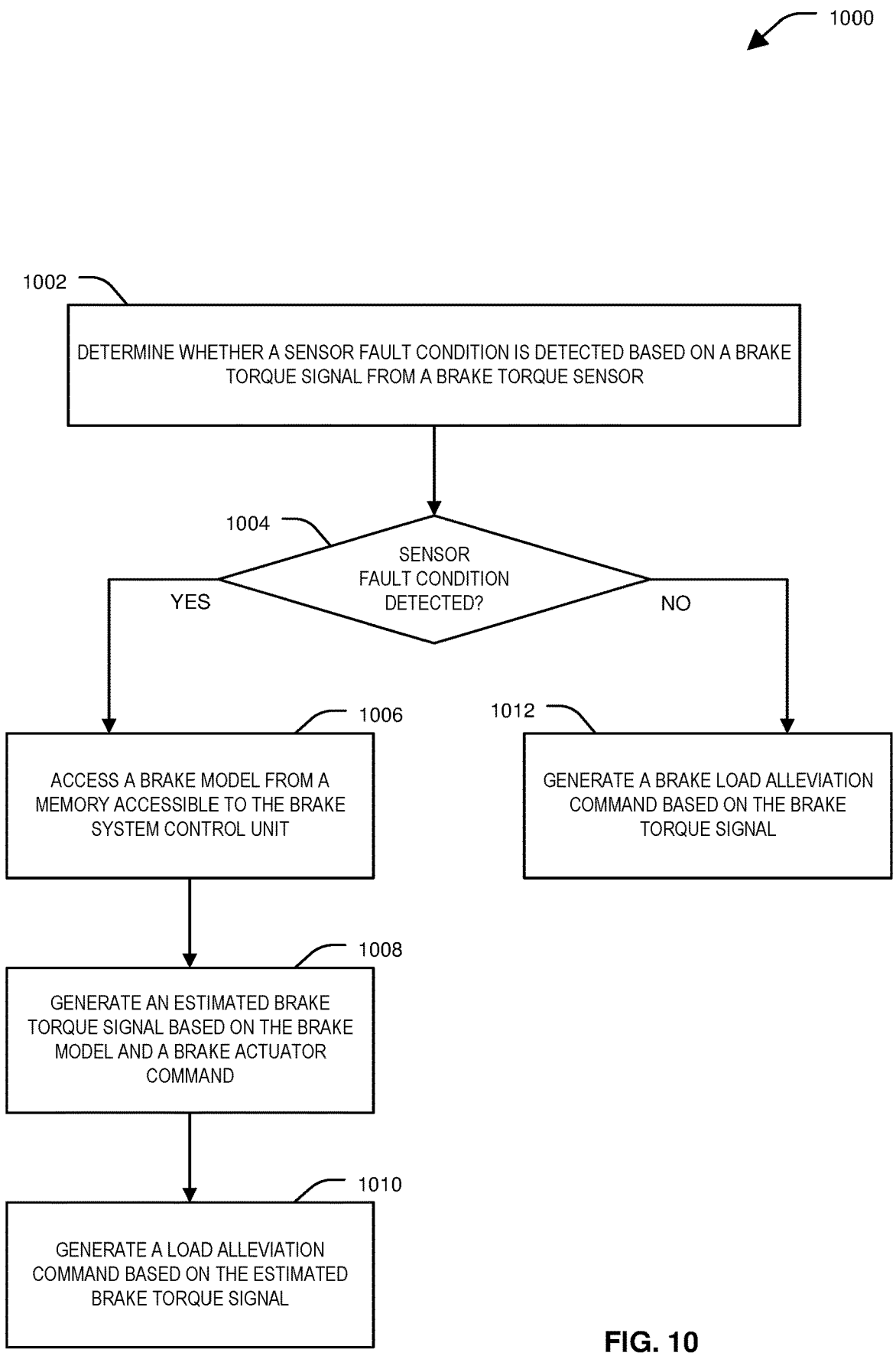
FIG. 10 is a flowchart of another method implemented by the brake system of FIG. 1 according to a particular implementation.

FIG. 10 is a flowchart of another example of a method 1000 that is implemented by the brake system 100 of FIGS. 1-4 according to a particular implementation. For example, the method 1000 may be initiated, performed, or controlled by the fault-tolerant torque system 130 or components thereof.

The method 1000 includes, at block 1002, determining whether a sensor fault condition is detected based on a brake torque signal 128 from a brake torque sensor 126. For example, the sensor monitor 240 of the fault-tolerant torque system 130 determines, based on the brake torque signal 128 from the brake torque sensor 126 whether a sensor fault condition is detected. In some implementations, the fault-tolerant torque system 130 also uses other data to determine whether a sensor fault condition is detected, such as a value of the brake pedal command 106, a value of the brake actuator command 118, a value of a brake operating environment signal 330, or a combination thereof.

When a determination is made, at block 1004, that no sensor fault condition is detected, the method 1000 includes, at block 1012, generating the brake actuation signal based on the brake torque signal. For example, as shown in FIG. 3, the fault-tolerant torque system 130 provides the brake torque signal 128 to the brake load alleviation system 134 when no sensor fault condition is present, and the brake load alleviation system 134 generates that load alleviation command 136 based on the brake torque signal 128. In this example, the control circuitry 222 uses the load alleviation command 136 and the brake pedal command 106 to generate the brake actuator command 118. Thus, in this situation, the brake actuator command 118 is based on the brake torque signal 128.

When a determination is made, at block 1004, that a sensor fault condition is detected, the method 1000 includes, at block 1006, accessing a brake model from a memory accessible to the brake system control unit. For example, the brake system control unit 220 of FIG. 2 accesses the brake model(s) 256. In some implementations, such as illustrated in FIGS. 5-7, the brake model(s) 256 includes a plurality of data entries representing historical brake torque values 506 corresponding to various brake actuator command values 502. In some such implementations, the plurality of data entries also include one or more default brake torque values 504, where each of the default brake torque values 504 represents a brake torque that is used for a respective brake command value until a sufficient number of historical brake torque values 506 are accumulated. In other implementations, the brake model(s) 256 includes parameters 440 of a brake gain function, such as Equation 1, and the values of the parameters 440 of the brake gain function are based on historical brake torque values and corresponding brake command values. In some such implementations, initial or default parameter values of the parameters 440 may be used until the parameters 440 are updated to generate update parameter values based on model update data 432.

The method 1000 also includes, at block 1008, generating an estimated brake torque signal 132 based on the brake model(s) 256 and a brake actuator command 118. For example, the torque estimator 250 generates the estimated brake torque signal 132 based on the brake model 256 and based on the brake actuator command 118. The brake actuator command 118 is generated in a manner that limits load applied to structures 202 of the vehicle 200 due to braking to less than a specified load limit. In some implementations, an estimated brake torque value of the estimated brake torque signal 132 is determined by interpolation between brake torque values from the brake model(s) 256.

The method 1000 also includes, at block 1010, generating a load alleviation command 136 based on the estimated brake torque signal 132. For example, as shown in FIGS. 1-4, the brake load alleviation system 134 generates the load alleviation command 136 based on the estimated brake torque signal 132 when a sensor fault condition is detected.

The method 1000 thus enables operation of a brake load alleviation system to continue when a sensor is present. The fault-tolerant brake load alleviation systems and methods disclosed use a vehicle-specific brake model that is generated and/or updated when no sensor fault is present to generate an estimated brake torque signal 132 when the brake torque signal 128 is not available or is not reliable (e.g., due to a sensor fault). Because the brake model is custom-built for the particular vehicle, the estimated brake torque signal 132 reliably limits the loads to which vehicles structures as subjected, enabling operation of the vehicle without imposing additional operational limits (e.g., operational weight limits or braking distance limits).

Figure 11:
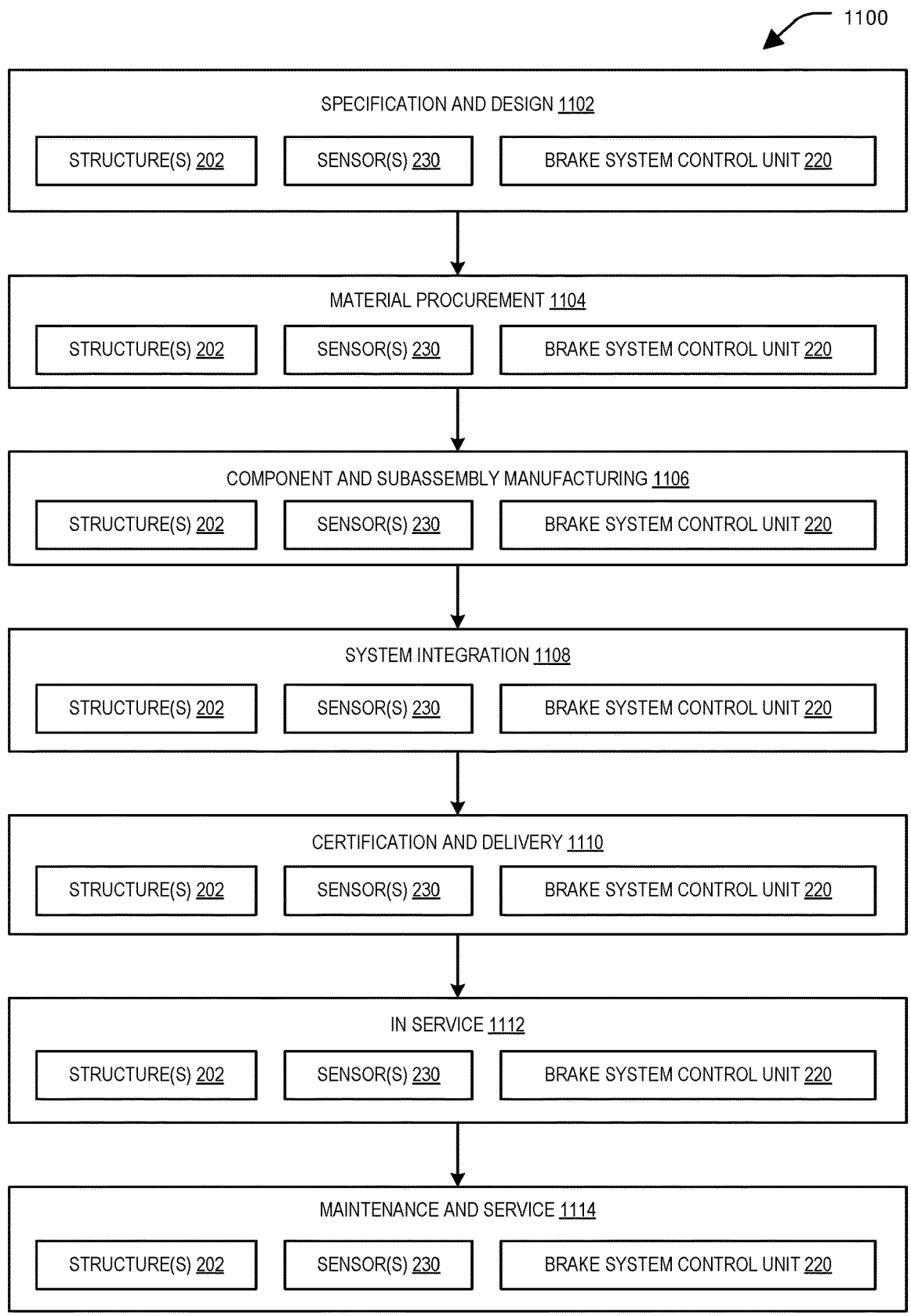
FIG. 11 is a flowchart illustrating a life cycle of a vehicle that includes the brake system control unit of FIG. 1.

FIG. 11 is a flowchart illustrating a method 1100 representing a life cycle of a vehicle that includes the structure(s) 202, the sensor(s) 230, and the brake system control unit 220 of FIG. 2. The vehicle can include an aircraft or a land craft.

Figure 12:
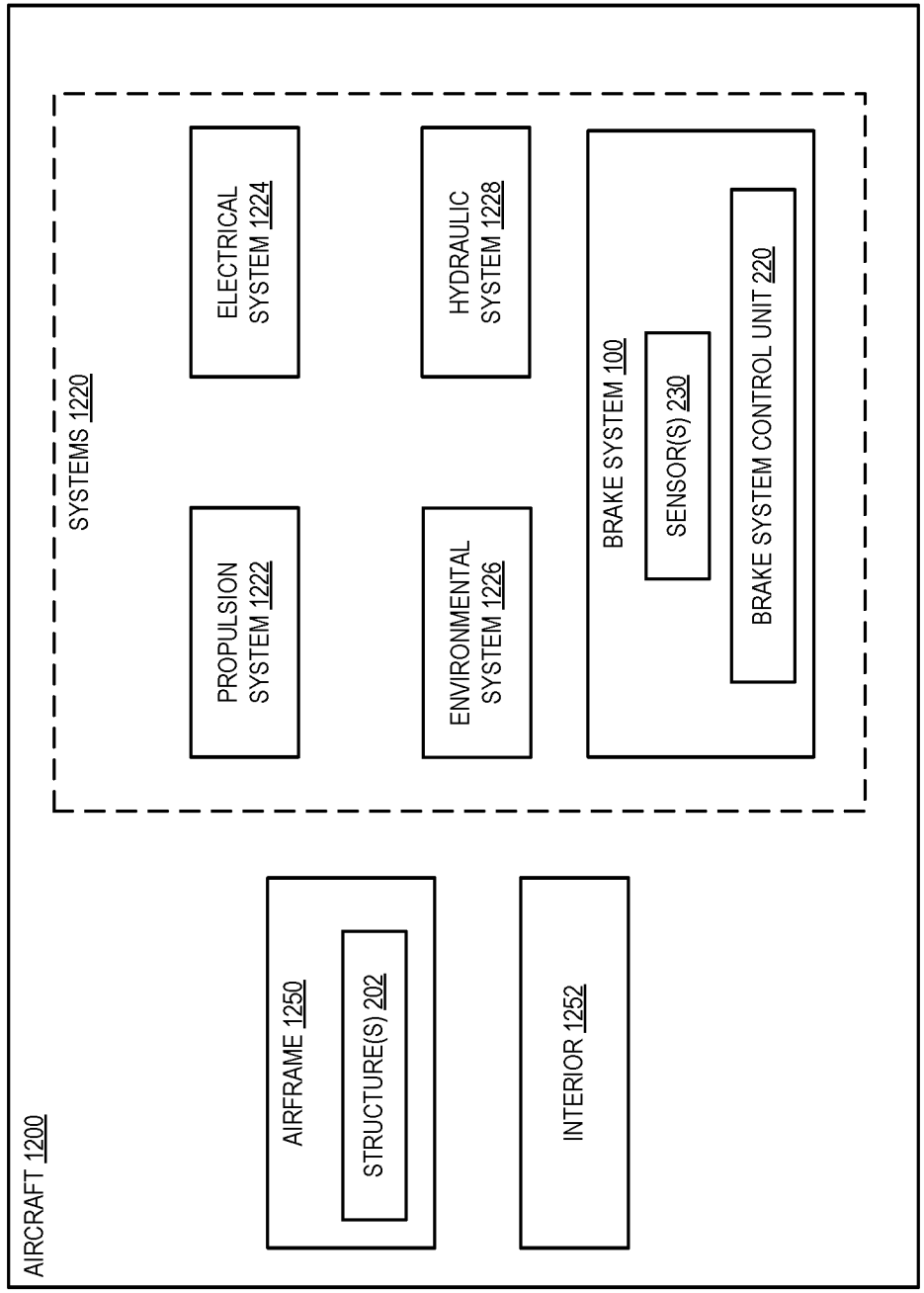
FIG. 12 is a diagram illustrating a particular example of a vehicle that includes the brake system control unit of FIG. 1.

During pre-production, the exemplary method 1100 includes, at 1102, specification and design of a vehicle, such as the vehicle 200 of FIG. 2, or the aircraft 1200 of FIG. 12. During specification and design of the vehicle, the method 1100 may include specification and design of the structure(s) 202, the sensor(s) 230, and the brake system control unit 220. At 1104, the method 1100 includes material procurement, which may include procuring materials for the structure(s) 202, the sensor(s) 230, and the brake system control unit 220.

During production, the method 1100 includes, at 1106, component and subassembly manufacturing and, at 1108, system integration of the vehicle. For example, the method 1100 may include component and subassembly manufacturing of and system integration of the structure(s) 202, the sensor(s) 230, and the brake system control unit 220. At 1110, the method 1100 includes certification and delivery of the vehicle and, at 1112, placing the vehicle in service. Certification and delivery may include certification of the structure(s) 202, the sensor(s) 230, and the brake system control unit 220 to place the structure(s) 202, the sensor(s) 230, and the brake system control unit 220 in service. While in service by a customer, the vehicle may be scheduled for routine maintenance and service (which may also include modification, reconfiguration, refurbishment, and so on). At 1114, the method 1100 includes performing maintenance and service on the vehicle, which may include performing maintenance and service on the structure(s) 202, the sensor(s) 230, and the brake system control unit 220.

Each of the processes of the method 1100 may be performed or carried out by a system integrator, a third party, and/or an operator (e.g., a customer). For the purposes of this description, a system integrator may include without limitation any number of manufacturers and major-system subcontractors; a third party may include without limitation any number of venders, subcontractors, and suppliers; and an operator may be an airline, a leasing company, a military entity, a service organization, and so on.

Aspects of the disclosure can be described in the context of an example of a vehicle. A particular example of a vehicle is an aircraft 1200 as shown in FIG. 12.

In the example of FIG. 12, the aircraft 1200 includes an airframe 1250 that includes the structure(s) 202. The aircraft 1200 also includes a plurality of systems 1220 and an interior 1252. Examples of the plurality of systems 1220 include one or more of a propulsion system 1222, an electrical system 1224, an environmental system 1226, a hydraulic system 1228, and the brake system 100. The brake system 100 includes the sensor(s) 230 and the brake system control unit 220 of FIG. 2. The aircraft 1200 may also include any number of other systems.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-10. In some implementations, part or all of one or more of the operations or methods of FIGS. 1-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A brake system control unit for a vehicle comprising:
   one or more sensor interfaces configured to receive a brake torque signal from a brake torque sensor;
   a torque estimator configured to generate an estimated brake torque signal based, at least in part, on a brake model and a brake actuator command; and
   control circuitry configured to generate the brake actuator command to actuate a brake actuator of a brake system, wherein the brake actuator command is generated based on a brake pedal command and a load alleviation command, wherein the load alleviation command is configured to protect a structural element of the vehicle during braking by limiting loads applied to the structural element to values less than a load limit, and wherein the load alleviation command is based on the brake torque signal or the estimated brake torque signal, depending on whether a sensor fault condition associated with the brake torque sensor is detected.

2. The brake system control unit of claim 1, further comprising a model updater configured to, when no sensor fault condition associated with the brake torque sensor is detected, update the brake model by storing model update data associating a brake actuator command value from the brake actuator command with a brake torque value from the brake torque signal.

3. The brake system control unit of claim 2, wherein the one or more sensor interfaces are further configured to receive sensor data from one or more brake operating environment sensors, and wherein the model update data further associates the brake actuator command value and the brake torque value with a brake operating environment value from the sensor data.

4. The brake system control unit of claim 3, wherein the one or more brake operating environment sensors measure one or more of a ground speed, a wheel speed, wheel temperature, or a brake temperature.

5. The brake system control unit of claim 1, wherein the brake model includes one or more tables, each table including a plurality of brake torque values and a corresponding plurality of brake actuator command values, and wherein the estimated brake torque signal is determined, at least in part, by looking up a particular brake torque value in the one or more tables based on a brake actuator command value from the brake actuator command.

6. The brake system control unit of claim 1, further comprising a sensor monitor configured to detect the sensor fault condition based on a comparison of a measured brake torque value of the brake torque signal to one or more fault criteria.

7. The brake system control unit of claim 6, wherein at least one fault criterion of the one or more fault criteria is based on one or more historical brake torque values and one or more brake actuator command values associated with the one or more historical brake torque values.

8. The brake system control unit of claim 1, wherein the vehicle is an aircraft.

9. The brake system control unit of claim 1, wherein the brake model includes one or more data tables, and wherein each of the one or more data tables includes, for each of a plurality of brake actuator command values, a running average of historical brake torque values.

10. The brake system control unit of claim 1, wherein the brake model includes parameters of a brake gain function, and wherein the parameters are based on one or more historical brake torque values.

11. The brake system control unit of claim 1, wherein the torque estimator is configured to, during a first period, use default parameter values of the brake model to generate the estimated brake torque signal and is configured to, during a second period subsequent to the first period, use updated parameter values of the brake model to generate the estimated brake torque signal, wherein the default parameter values are based on test data, and wherein updated parameter values are based on sensor data values from the brake system.

12. The brake system control unit of claim 1, wherein the brake model is configured to indicate an estimated brake torque value based on a value of the brake actuator command and a brake operating environment value.

13. A method comprising:
   determining, at a brake system control unit of a vehicle, whether a sensor fault condition is detected based on a brake torque signal from a brake torque sensor;

in response to detecting the sensor fault condition:
   accessing a brake model from a memory accessible to the brake system control unit;
   generating an estimated brake torque signal based on the brake model and a brake actuator command; and
   generating a load alleviation command based on the estimated brake torque signal, wherein the load alleviation command is configured to protect a structural element of the vehicle by limiting loads applied to the structural element to values less than a load limit.

14. The method of claim 13, further comprising, in response to no sensor fault condition being detected, generating the load alleviation command based on the brake torque signal.

15. The method of claim 13, wherein the brake model comprises a plurality of data entries representing historical brake torque values corresponding to various brake actuator command values.

16. The method of claim 15, wherein the plurality of data entries further comprises one or more default data entries, and wherein each of the one or more default data entries represents a default brake torque value corresponding to a respective brake actuator command value.

17. The method of claim 13, wherein the brake model comprises parameters of a brake gain function, and wherein values of the parameters of the brake gain function are based on historical brake torque values and corresponding brake actuator command values.

18. The method of claim 13, wherein an estimated brake torque value of the estimated brake torque signal is determined by interpolation between historical brake torque values from the brake model.

19. The method of claim 13, further comprising determining a brake pedal command based on a brake pedal sensor.

20. The method of claim 13, wherein the vehicle is an aircraft.

21. A vehicle comprising
   one or more wheels coupled to a structure;
   one or more brake systems, each brake system comprising one or more sensors and one or more brake actuators; and
   one or more brake system control units, each brake system control unit comprising:
      one or more sensor interfaces configured to receive a brake torque signal from a brake torque sensor;
      a torque estimator configured to generate an estimated brake torque signal based, at least in part, on a brake model and a brake actuator command; and
      control circuitry configured to generate the brake actuator command to actuate a brake actuator of the one or more brake actuators, wherein the brake actuator command is generated based on a brake pedal command and a load alleviation command, wherein the load alleviation command is configured to protect a structural element of the vehicle during braking by limiting loads applied to the structural element to values less than a load limit, and wherein the load alleviation command is based on the brake torque signal or the estimated brake torque signal.

22. The vehicle of claim 21, further comprising at least one of an autobrake system or an antiskid system coupled to the one or more brake system control units, wherein the brake actuator command is based, at least in part, on a signal from the at least one of the autobrake system or the antiskid system.

23. The vehicle of claim 21, wherein the one or more brake system control units comprise a brake load alleviation system configured to generate the load alleviation command to limit load applied to a portion of the structure due to braking to less than a specified load limit.

* * * * *